US011553256B2

(12) United States Patent
Li et al.

(10) Patent No.: US 11,553,256 B2
(45) Date of Patent: Jan. 10, 2023

(54) METHOD AND DEVICE FOR PROCESSING MESSAGE IN LIVE BROADCAST ROOM

(71) Applicant: BEIJING DAJIA INTERNET INFORMATION TECHNOLOGY CO., LTD., Beijing (CN)

(72) Inventors: Shangsheng Li, Beijing (CN); Weibo Li, Beijing (CN); Qun Wang, Beijing (CN)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/681,693

(22) Filed: Feb. 25, 2022

(65) Prior Publication Data
US 2022/0303635 A1   Sep. 22, 2022

(30) Foreign Application Priority Data
Mar. 22, 2021   (CN) .......................... 202110299596.X

(51) Int. Cl.
*H04N 21/488*   (2011.01)
*H04N 21/2187*   (2011.01)

(52) U.S. Cl.
CPC ..... *H04N 21/4882* (2013.01); *H04N 21/2187* (2013.01)

(58) Field of Classification Search
None
See application file for complete search history.

(56) References Cited

U.S. PATENT DOCUMENTS

| 2017/0339081 | A1* | 11/2017 | Beust .................. H04W 4/08 |
| 2020/0413125 | A1 | 12/2020 | Roberson |
| 2021/0218693 | A1* | 7/2021 | Zhang ................. H04L 65/611 |

FOREIGN PATENT DOCUMENTS

| CN | 106375799 A | | 2/2017 | |
| CN | 109640130 A | * | 4/2019 | ....... H04N 21/25808 |

(Continued)

OTHER PUBLICATIONS

Chinese Office Action dated Apr. 27, 2021, from application No. 202110299596.X, 11 pages.
(Continued)

*Primary Examiner* — William J Kim
(74) *Attorney, Agent, or Firm* — Foley & Lardner LLP

(57) ABSTRACT

The present disclosure relates to methods, devices, and storage media for processing message in a live broadcast room, including in response to detecting that a target message interaction interface among pre-configured message interaction interfaces is called, obtaining a message configuration parameter corresponding to the target message interaction interface, obtaining a service type and a caller account incoming with the target message interaction interface, the message interaction interface being used for respective accounts in the live broadcast room for message interaction, determining a respective content to be sent according to the service type and the caller account, determining a respective target client according to an account type of the caller account, performing splicing processing on the content to be sent according to the message configuration parameter to obtain a target message, and sending the target message to the target client.

19 Claims, 7 Drawing Sheets

(56) References Cited

FOREIGN PATENT DOCUMENTS

| CN | 110602513 | A | * | 12/2019 | ......... H04N 21/2187 |
| CN | 111083508 | A | * | 4/2020 | |
| CN | 111147887 | A | * | 5/2020 | |
| CN | 111355986 | A | | 6/2020 | |
| CN | 111917843 | A | | 11/2020 | |
| CN | 111970526 | A | * | 11/2020 | ......... H04N 21/2187 |
| CN | 112035770 | A | * | 12/2020 | |
| CN | 112099795 | A | * | 12/2020 | |
| CN | 112104884 | A | * | 12/2020 | ......... H04N 21/2187 |
| CN | 112399263 | A | | 2/2021 | |
| CN | 112422999 | A | * | 2/2021 | ......... H04N 21/2187 |
| CN | 112423011 | A | * | 2/2021 | |
| CN | 112689202 | B | | 6/2021 | |

OTHER PUBLICATIONS

Notification to Grant Patent Right for Invention dated May 12, 2021, from application No. 202110299596.X, 6 pages.

* cited by examiner

METHOD AND DEVICE FOR PROCESSING MESSAGE IN LIVE BROADCAST ROOM

CROSS REFERENCE TO RELEVANT APPLICATION

The present application claims priority to Chinese patent application No. 202110299596.X, filed on Mar. 22, 2021, which is incorporated herein by reference in its entirety for all purposes.

TECHNICAL FIELD

The present disclosure relates to the field of computer technologies, and in particular to methods, devices, servers, and storage media for processing a message in a live broadcast room.

BACKGROUND

With the rapid development of the live broadcast industry, more and more users are watching live broadcast programs provided by live broadcast platforms as their daily entertainment activities. Users can also interact with the live broadcasts by providing comments in the virtual live broadcast room.

SUMMARY

According to some arrangements of the present disclosure, a method for processing a message in a live broadcast room is provided. The method includes in response to detecting that a target message interaction interface among pre-configured message interaction interfaces is called, obtaining a message configuration parameter corresponding to the target message interaction interface, and obtaining a service type and a caller account incoming with the target message interaction interface, the message interaction interface being used for respective accounts in the live broadcast room for message interaction. The method further includes determining a respective content to be sent according to the service type and the caller account, and determining a respective target client according to an account type of the caller account. Further, the method also includes performing splicing processing on the content to be sent according to the message configuration parameter to obtain a target message, and sending the target message to the target client.

According to some arrangements of the present disclosure, a device for processing a message in a live broadcast room is provided. The device includes an obtaining unit, configured to in response to detecting that a target message interaction interface among pre-configured message interaction interfaces is called, obtain a message configuration parameter corresponding to the target message interaction interface, and obtain a service type and a caller account incoming with the target message interaction interface. The message interaction interface is used for respective accounts in the live broadcast room for message interaction. The device further includes a determining unit, configured to determine a respective content to be sent according to the service type and the caller account and determine a respective target client according to an account type of the caller account. The device further includes a sending unit, configured to perform splicing processing on the content to be sent according to the message configuration parameter to obtain a target message and send the target message to the target client.

According to some arrangements of the present disclosure, an electronic device including a memory and a processor is provided, the memory storing a computer program, and the computer program, when executed by the processor, implements the method for processing a message in a live broadcast room described herein.

According to some arrangements of the present disclosure, a non-transitory computer readable storage medium having a computer program stored thereon is provided, which computer program, when executed by a processor, implements the method for processing a message in a live broadcast room described herein. According to some arrangements of the present disclosure, a computer program product including a computer program stored in a non-transitory computer readable storage medium is provided, at least one processor of a device reading the computer program from the non-transitory computer readable storage medium and executes the computer program to cause the device to execute the method for processing a message in a live broadcast room described herein.

It should be noted that the above general description and the following detailed description are merely examples and explanatory and should not be construed as limiting of the present disclosure.

BRIEF DESCRIPTION OF THE DRAWINGS

The accompanying drawings, which are incorporated into and constitute a part of the present disclosure, illustrate arrangements consistent with the present disclosure and, together with the description, serve to explain the principle of the present disclosure, and do not expose any improper limitation on the present disclosure.

DETAILED DESCRIPTION

In order to make a person skilled in the art better understand the technical solutions of the present disclosure, the following clearly and completely describes the technical solutions in arrangements of the present disclosure with reference to the accompanying drawings.

It should be noted that in the present specification, the claims, and the accompanying drawings of the present disclosure, the terms "first," "second," and so on are intended to distinguish similar objects but do not necessarily indicate a specific order or sequence. It is to be understood that data (or any element) termed in such a way is interchangeable in proper circumstances, so that arrangements of the present disclosure described herein may be implemented in other sequences than the sequence illustrated or described herein. The implementations set forth in the following description of arrangements do not represent all implementations consistent with the present disclosure. Instead, they are merely examples of devices and methods consistent with aspects related to the present disclosure as recited in the appended claims.

In the related art, comment messages in the live broadcast room often lack a unified configuration when they are sent to respective clients. Messages in each comment area are independently developed by respective services with different data formats and strange message styles. As a result, the comment messages are messily displayed by the client, and a server of the live broadcast platform has a problem of low processing efficiency when processing these comment messages in the live broadcast room.

Figure 1:
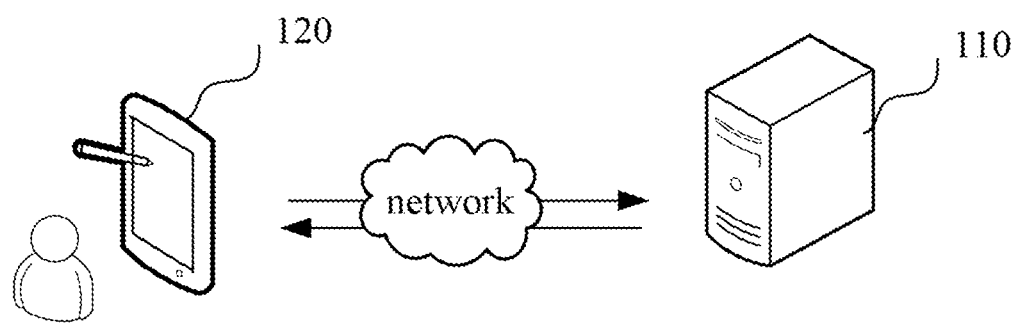
FIG. 1 is a diagram showing an application environment of a method for processing a message in a live broadcast room according to some arrangements.

The method for processing a message in a live broadcast room provided by the present disclosure can be applied to an application environment as shown in FIG. 1. A server 110 detects that a target message interaction interface among pre-configured message interaction interfaces has been called, obtains a message configuration parameter corresponding to the target message interaction interface, and obtains a service type and a caller account incoming with the target message interaction interface. The message interaction interface is used for respective accounts in the live broadcast room for message interaction. The server 110 determines a respective content to be sent according to the service type and the caller account, and determines a respective target client according to an account type of the caller account. The server 110 performs splicing processing on the content to be sent according to the message configuration parameter to obtain a target message, and sends the target message to the target client. In some arrangements, the target client 120 can be, but is not limited to, various personal computers, laptops, smart phones, tablet computers, and portable wearable devices. The server 110 can be implemented by an independent server or a server cluster composed of multiple servers.

Figure 2:
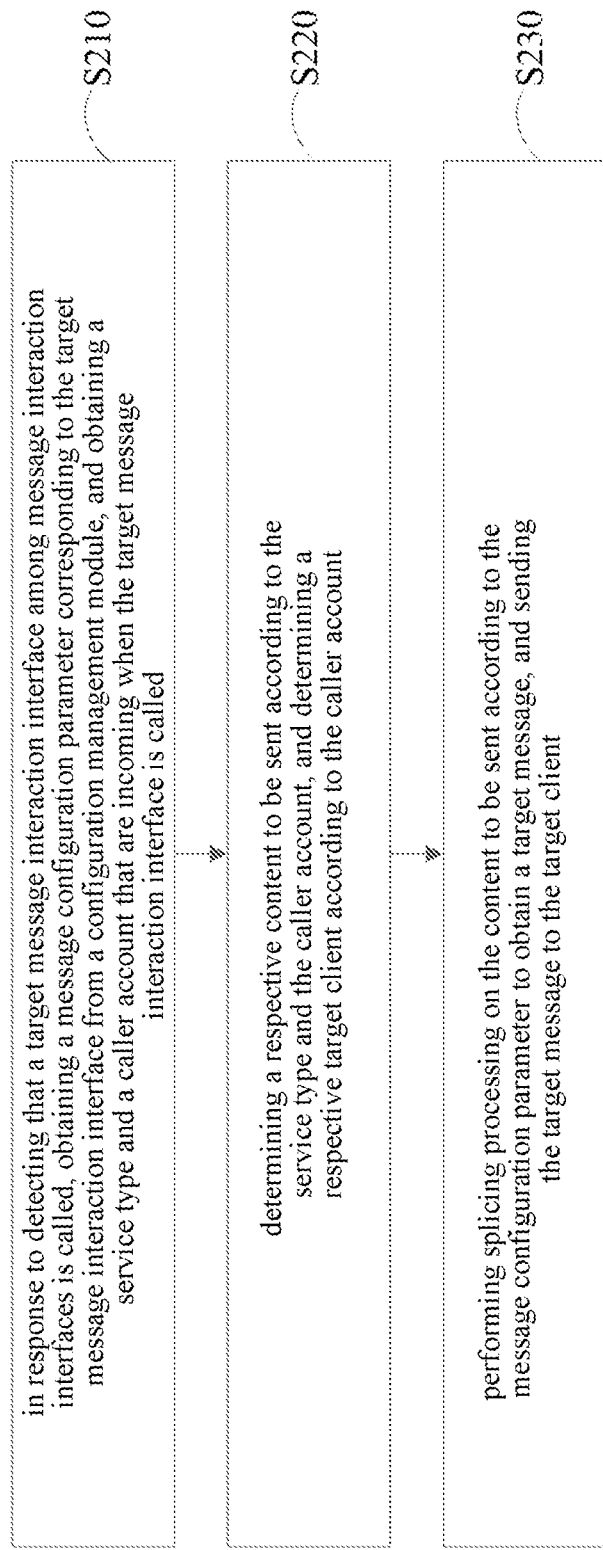
FIG. 2 is a flowchart showing a method for processing a message in a live broadcast room according to some arrangements.

FIG. 2 is a flowchart showing a method for processing a message in a live broadcast room according to some arrangements. As shown in FIG. 2, the method for processing a message in a live broadcast room is applied to the server 110 in FIG. 1, and the server 110 is configured with a configuration information management module and a message interaction interface. The message interaction interface includes at least one of an interaction interface oriented to a user account in the live broadcast room and an interaction interface oriented to a service party account in the live broadcast room. The method includes S210, S220 and S230 which are discussed in the following of the method for processing a message in a live broadcast room according to some arrangements of the present disclosure.

The configuration information management module may refer to configuration information used to receive message in the live broadcast room. In some arrangements, the message can refer to a strong message in a comment area. In some arrangements, the configuration information management module can also be named as a configuration management service platform Kconf.

The interaction interface oriented to the user account in the live broadcast room may include at least one of a viewer status interface (UserStatus interface), an anchor status interface (AuhtorStatus interface), and a delay request interface (DelayInfos interface). The interaction interface oriented to the service party account in the live broadcast room may include at least one of a broadcast interface and a unicast interface.

In S210, in response to detecting that a target message interaction interface among message interaction interfaces is called, a message configuration parameter corresponding to the target message interaction interface is obtained from the configuration management module, and a service type and a caller account incoming with the target message interaction interface are obtained.

The message configuration parameter can also be named as message configuration information.

In some arrangements, when the caller account enters the live broadcast room, a client of the caller account calls the target message interaction interface among the pre-configured message interaction interfaces. When the target message interaction interface among server message interaction interfaces is called by the client, the server obtains the service type and the caller account incoming with the target message interaction interface. In addition, the server can also obtain the message configuration parameter corresponding to the target message interaction interface from the configuration management module. Specifically, the server may first determine an interface type corresponding to the target message interaction interface. Then, the server can query the respective message configuration parameter in the configuration management module according to the interface type.

In some arrangements, the server can also determine whether the caller account has the permission for sending strong message through the interface (function switch) based on ID information of the caller account. If the caller account does not have the permission for sending strong message through the interface (function switch), the flow ends.

In S220, the respective content to be sent is determined according to the service type and the caller account, and a respective target client is determined according to the caller account.

In some arrangements, the server determines the respective content to be sent according to the service type and the caller account. Specifically, different service types and caller accounts have different contents to be sent. For example, in response to determining that the anchor account has uncompleted tasks and is in an unread status, the content to be sent may be the strong message in the comment area of the anchor task. The server determines the respective target client according to the caller account.

In response to determining that the caller account is a user account in the live broadcast room, a client corresponding to the user account is used as the target client. The user account in the live broadcast room is the anchor account or the viewer account, and the target client is a client corresponding to the anchor account or a client corresponding to the viewer account.

Specifically, in response to determining that the caller account is the viewer account in the live broadcast room, and the client corresponding to the viewer account calls the viewer status interface (UserStatus interface), the server may use the client corresponding to the viewer account as the target client for sending message.

In response to determining that the caller account is the anchor account in the live broadcast room, and the client corresponding to the anchor account calls the anchor status interface (AuhtorStatus interface), the server may use the client corresponding to the anchor account as the target client for sending message.

If the caller account is a service party account in the live broadcast room, the server may use the client corresponding to the anchor account and/or the viewer account in the live broadcast room as the target client for sending message.

In S230, splicing processing is performed on the content to be sent according to the message configuration parameter to obtain a target message, and the target message is sent to the target client.

In some arrangements, after the server obtains the message configuration parameter, the server performs splicing processing on the content to be sent according to the message configuration parameter to obtain the target message. The server may send the target message to the target client.

After receiving the target message, the target client performs sorting according to a display time and a message priority of the target message, and puts the target message into a display queue. Then, the target client displays the target message according to the display queue.

In the above method for processing a message in a live broadcast room, by detecting that the target message interaction interface among the pre-configured message interaction interfaces has been called, the message configuration parameter corresponding to the target message interaction interface is obtained, and the service type and the caller account incoming with the target message interaction interface can be obtained. The message interaction interface is used for respective accounts in the live broadcast room for message interaction. Further, the respective content to be sent is determined according to the service type and the caller account, and the respective target client is determined according to the account type of the caller account. Then, the splicing processing is performed on the content to be sent according to the message configuration parameter to obtain the target message, and the target message is sent to the target client. Accordingly, messages in the live broadcast room sent to the respective clients can be uniformly configured by a server, so as to avoid the low processing efficiency of message in the live broadcast room by the server due to independent development of each service, different data formats, and strange message styles. This effectively improves the processing efficiency of message in the live broadcast room by the server.

In some arrangements, the determining the respective target client according to the caller account includes: obtaining a message sending mode corresponding to the target message interaction interface in response to determining that the caller account is a service party account in the live broadcast room; and determining the respective target client according to the message sending mode. The target client includes the client corresponding to the anchor account and/or the client corresponding to the viewer account in the live broadcast room.

In some arrangements, the process of determining the respective target client according to the caller account includes: in response to determining that the caller account is the service party account in the live broadcast room, the server can obtain the message sending mode corresponding to the target message interaction interface; and determines the respective target client according to the message sending mode. The target client includes the client corresponding to the anchor account and/or the client corresponding to the viewer account in the live broadcast room.

The interaction interface oriented to the service party account in the live broadcast room includes at least one of a broadcast interface and a unicast interface.

The process of the server obtaining the message sending mode corresponding to the target message interaction interface includes: in response the server determining that the target message interaction interface called by the service party account is the broadcast interface, the server determines that the message sending mode corresponding to the target message interaction interface is a broadcast mode. In this case, the server uses the client corresponding to the anchor account and the client corresponding to the viewer account as the target client. Accordingly, the server can subsequently send the target message to the client corresponding to the anchor account and the client corresponding to the viewer account. In some arrangements, the server can use long link technology components for broadcast to all clients in the live broadcast room. Thus, the target message can be sent to the client corresponding to the anchor account and the client corresponding to the viewer account.

In response to the server determining that the target message interaction interface called by the service party account is the unicast interface, the server determines that the message sending mode corresponding to the target message interaction interface is a unicast mode. In this case, the server obtains a receiver account incoming with the target message interaction interface. The receiver account is at least one of the anchor account or the viewer account. The server uses a client corresponding to the receiver account as the target client. In some arrangements, the server can use an instant messaging (IM) component to send the target message to the client corresponding to the receiver account.

Figure 3:
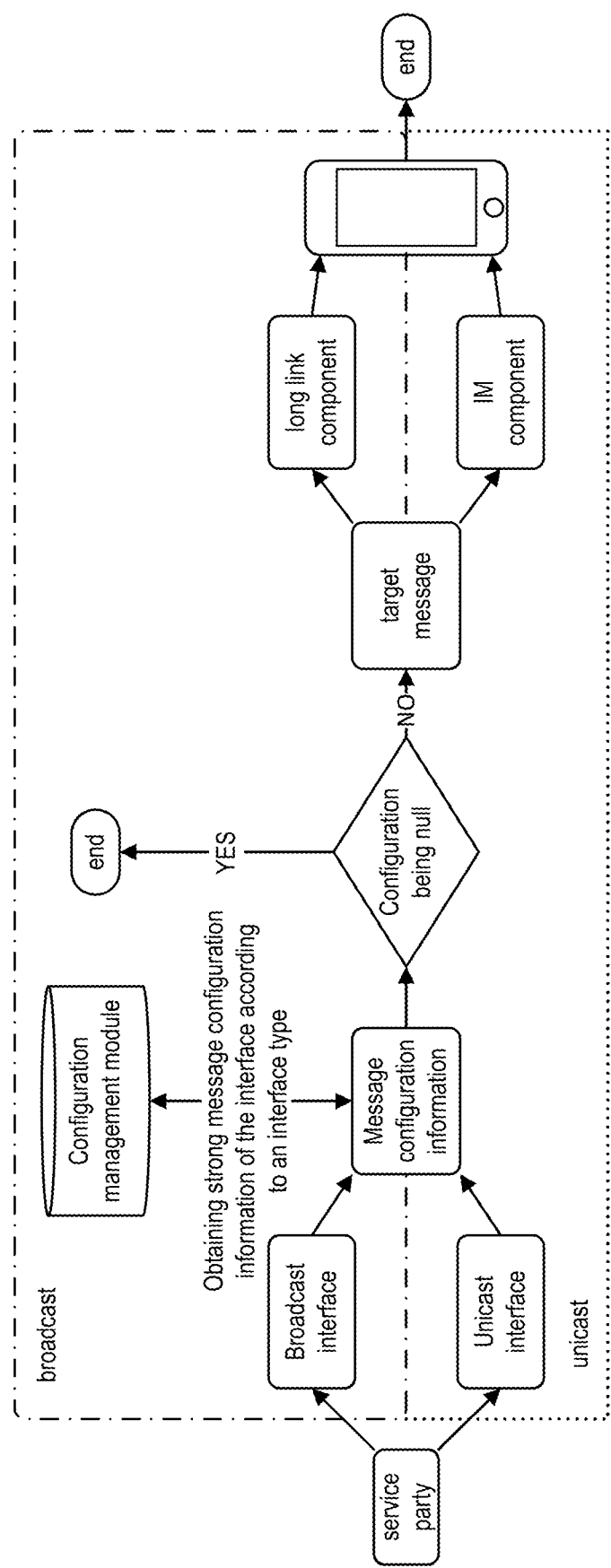
FIG. 3 is a flowchart showing a method for sending a message in a live broadcast room according to some arrangements.

In order to facilitate the understanding of those skilled in the art, FIG. 3 provides a schematic flowchart of a method for sending a message in a live broadcast room. As shown in FIG. 3, in response to determining that the target message interaction interface called by the service party account is the broadcast interface, the server obtains the message configuration parameter corresponding to an interface type of the broadcast interface from the configuration management module. Then, the server performs the splicing processing on the content to be sent according to the message configuration parameter to obtain the target message. After that, the server can adopt the long link technology components for broadcast to all clients in the live broadcast room, so as to send the target message to the client corresponding to the anchor account and the client corresponding to the viewer account.

In response to determining that the target message interaction interface called by the service party account is the unicast interface, the server obtains the message configuration parameter corresponding to the interface type of the unicast interface from the configuration management module. Then, the server performs the splicing processing on the content to be sent according to the message configuration parameter to obtain the target message. After that, the server can use the instant messaging (IM) component to send the target message to the client corresponding to the receiver account.

In some arrangements, in response to determining that the caller party account is the service party account in the live broadcast room, the message sending mode corresponding to the target message interaction interface is obtained, and the respective target client is determined according to the message sending mode. The target client includes the client corresponding to the anchor account and/or the client corresponding to the viewer account in the live broadcast room. Accordingly, each client in the live broadcast room can receive message in the comment area of the live broadcast room that each client needs to obtain.

In some arrangements, the interaction interface oriented to the user account in the live broadcast room includes an account status interface and a delay request interface. The determining the respective content to be sent according to the service type and the caller account includes: querying account status information according to the service type and the caller account in response to determining that the target message interaction interface is the account status interface; where the content to be sent is the account status information.

In response to determining that the target message interaction interface is the delay request interface, a delay display message of the caller account corresponding to the service type in the live broadcast room is used as the content to be sent.

The account status information is relevant status information of the caller account corresponding to the service type in the live broadcast room. In some arrangements, the account status information can also be named as related configuration information.

The interaction interface oriented to the user account in the live broadcast room includes an account status interface and a delay request interface.

The account status interface includes a viewer status interface (UserStatus interface) and an anchor status interface (AuhtorStatus interface).

In some arrangements, the process of the server determining the respective content to be sent according to the service type and the caller account includes: in response to the server determining that the called target message interaction interface is the account status interface, the server queries the account status information according to the service type and the caller account. The server uses the account status information as the content to be sent. For example, after the viewer account enters the live broadcast room, the client of the viewer account requests this interface to obtain the relevant configuration information of the viewer account in the live broadcast room. After the anchor account starts a live broadcast, the client of the anchor account requests this interface to obtain the relevant configuration information of the viewer account in the live broadcast room.

In response to the server determining that the target message interaction interface called by the caller account is the delay request interface, the server uses the delay display message of the caller account corresponding to the service type in the live broadcast room as the content to be sent.

In the technical solution of an arrangement, in response to determining that the target message interaction interface is the account status interface, the account status information is queried according to the service type and the caller account, and the account status information is used as the content to be sent. In response to determining that the target message interaction interface is the delay request interface, the delay display message of the caller account corresponding to the service type in the live broadcast room is used as the content to be sent. Accordingly, it is achieved that according to the type of the message interface called by the caller account, the server can adaptively send the message that the client of the caller account needs to display to the client of the caller account for display.

In some arrangements, the above-mentioned method for processing a message in a live broadcast room further includes: sending a message delay display instruction to a client of the caller account. After the message delay display instruction is received by the client of the caller account, and in response to detecting that the caller account has entered and stayed in the live broadcast room for a message delay display time, the delay request interface is called.

The message delay display instruction carries the message delay display time for the delay request interface.

In some arrangements, the server may also send the message delay display instruction to the client of the caller account. Then, after the message delay display instruction is received by the client of the caller account, the message delay display time carried by the message delay display instruction is determined. In response to determining that the client of the caller account has detected that the caller account has entered and stayed in the live broadcast room for the message delay display time, the delay request interface is called. Accordingly, it is achieved that the client of the caller account delays the display of the delay display message of the caller account corresponding to the service type in the live broadcast room.

In the technical solution of an arrangement, the message delay display instruction is sent to the client of the caller account, and after the message delay display instruction is received by the client of the caller account, the delay request interface is called in response to detecting that the caller account has entered and stayed in the live broadcast room for the message delay display time. Thus, it is avoided that the server immediately sends messages in the comment area as soon as the viewer has been detected to enter the live broadcast room, even if many viewers cannot stay in the live broadcast room for a preset time, which causes a waste of server performance.

In some arrangements, the performing the splicing processing on the content to be sent according to the message configuration parameter to obtain the target message includes: determining whether the caller account under the service type has a permission for sending message; obtaining target sending content corresponding to the service type in response to determining that the caller account under the service type has the permission for sending message, the target sending content including service information corresponding to the service type; and performing the splicing processing on the content to be sent and the target sending content according to the message configuration parameter to obtain the target message.

The target sending content includes the service information corresponding to the service type. In some arrangements, since the target sending content is content attached to the content to be sent, the target sending content can also be named as extra sending content (extraInfo).

The process of the server performing the splicing processing on the content to be sent according to the message configuration parameter to obtain the target message includes as follows. The server can determine whether the account under the service type has the permission for sending message. In response to determining that the account under the service type has the permission for sending message, the server obtains the target sending content corresponding to the service type. The server performs the splicing processing on the content to be sent and the target sending content according to the message configuration parameter to obtain the target message Specifically, the server can obtain an implementation of a docking party interface according to the service type, so that the service party can implement the following four methods according to the interface provided herein: obtaining a service type of implementation class (getNoticeBiz); determining whether the user can send the strong message (shouldSend); obtaining some extra information (getExtraInfo) that the service needs to send; and the service decorating the entire view to replace a basic field (decorateView). In the process of determining whether the account under the service type has the permission for sending message, the server can determine whether the user has the permission for sending message according to a live broadcast room ID, a user ID, and a user role type. If the user has the permission for sending message, it is determined that the caller account under the service type has the permission for sending message, the target sending content corresponding to the service type is obtained. Specifically, the server can obtain the target sending content (extraInfo) corresponding to the service type for the caller account according to the live broadcast room ID, the user ID, and the user role type. The server performs the splicing processing on the content to be sent and the target sending content according to the message configuration parameter to obtain the target message.

In the technical solution of an arrangement, it is determines whether the caller account under the service type has the permission for sending message. In response to determining that the caller account under the service type has the permission for sending messages, the target sending content corresponding to the service type is obtained. According to the message configuration parameter, the splicing processing is performed on the content to be sent and the target sending content to obtain the target message. Accordingly, the target client can obtain the strong message in the comment area that meets the current service type, which avoids the target client from displaying redundant messages.

In some arrangements, the performing the splicing processing on the content to be sent and the target sending content according to the message configuration parameter to obtain the target message includes: querying message view content corresponding to the service type and used to replace the content to be sent; and performing the splicing processing on the message view content and the target sending content according to the message configuration parameter to obtain a target message view as the target message.

In some arrangements, the process of the server performing the splicing processing on the content to be sent and the target sending content according to the message configuration parameter to obtain the target message includes: the server querying the message view content corresponding to the service type and used to replace the content to be sent; and then the server performing the splicing processing on the message view content and the target sending content according to the message configuration parameter to obtain the target message view as the target message. That is, the entire view (message view) is spliced.

In the technical solution of an arrangement, the message view content corresponding to the service type and used to replace the content to be sent is queried, and the splicing processing is performed on the message view content and the target sending content according to the message configuration parameter to obtain the target message view be sent to the client in the live broadcast room.

Figure 4:
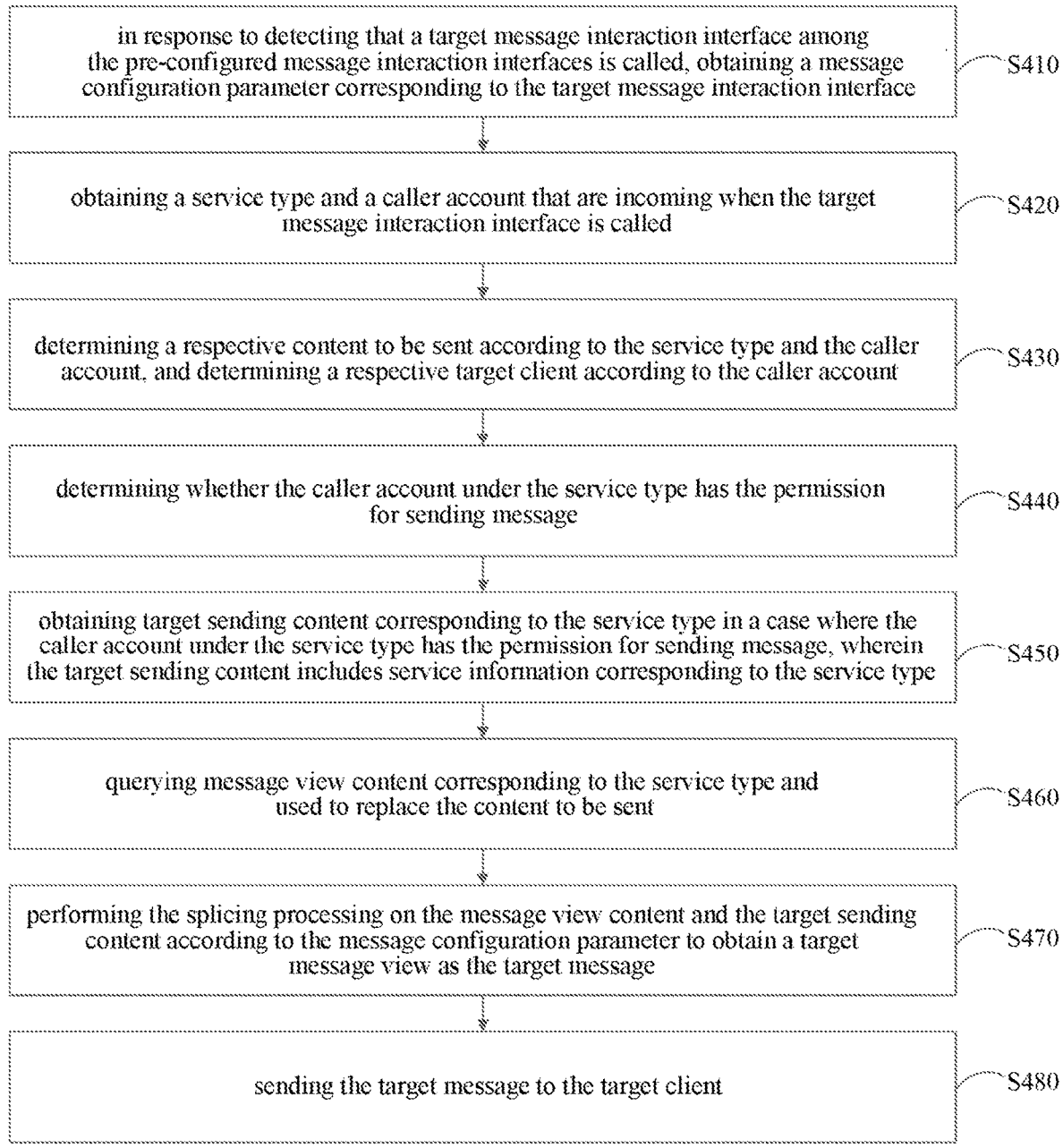
FIG. 4 is a flowchart showing a method for processing a message in a live broadcast room according to some arrangements.

FIG. 4 is a flowchart showing another method for processing a message in a live broadcast room according to some arrangements. As shown in FIG. 4, the method is applied to the server 110 in FIG. 1. In S410, it is detected that a target message interaction interface among pre-configured message interaction interfaces has been called, and a message configuration parameter corresponding to the target message interaction interface is obtained. In S420, a service type and a caller account incoming with the target message interaction interface are obtained. In S430, a respective content to be sent is determined according to the service type and the caller account, and a respective target client is determined according to the caller account. In S440, it is determined whether the caller account under the service type has the permission for sending message. In S450, target sending content corresponding to the service type is obtained in response to determining that the caller account under the service type has the permission for sending message. The target sending content includes service information corresponding to the service type. In S460, message view content corresponding to the service type and used to replace the content to be sent is queried. In S470, the splicing processing is performed on the message view content and the target sending content according to the message configuration parameter to obtain a target message view as the target message. In S480, the target message is sent to the target client. It should be noted that the specific definitions of the method can be referred to the specific definitions of the method for processing a message in a live broadcast room above, which will not be repeated here.

It should be understood that although various blocks in the flowcharts of FIG. 2 and FIG. 4 are sequentially displayed as indicated by arrows, these blocks are not necessarily sequentially performed in an order indicated by these arrows. Unless otherwise clearly specified in the present specification, these blocks are performed without any strict sequence limit, and may be performed in other orders. In addition, at least some blocks in FIG. 2 and FIG. 4 may include a plurality of blocks, and these blocks are not necessarily performed at a same time instant, but may be performed at different time instants. The blocks are not necessarily performed in sequence, and the blocks or stages may be performed alternately with at least some of other blocks, sub-blocks or blocks of other blocks.

Figure 5:
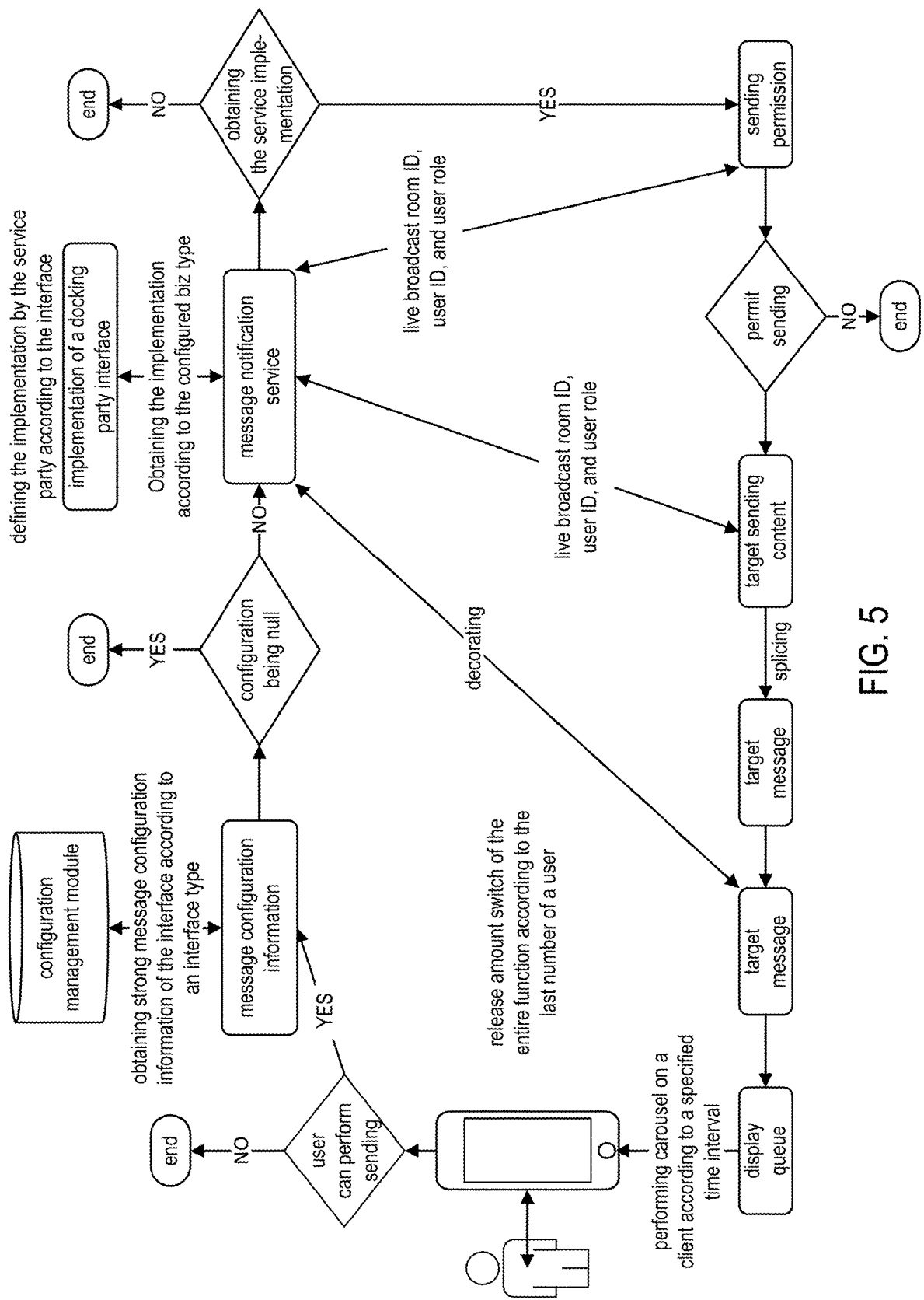
FIG. 5 is a flow block diagram showing another method for sending a message in a live broadcast room according to some arrangements.

FIG. 5 is a flow block diagram showing another message sending in a live broadcast room according to some arrangements. As shown in FIG. 5, in response to the server detecting that the target message interaction interface among the message interaction interfaces has been called, the server first detects whether the caller account has the permission for calling the target message interaction interface. In response to determining that the caller account has the permission for calling the target message interaction interface, the server obtains the message configuration parameter corresponding to the target message interaction interface from the configuration management module, and obtains the service type and the caller account incoming with the message interaction interface. The server determines the respective content to be sent according to the service type and the caller account, and determines the respective target client according to the caller account. The server performs the splicing processing on the content to be sent according to the message configuration parameter to obtain the target message, and sends the target message to the target client. Specifically, the server can determine whether the user has the permission for sending message, that is, whether the message can be sent, according to a live broadcast room ID, a user ID, and a user role type. If the user has the permission for sending message, it is determined that the caller account under the service type has the permission for sending message, the target sending content corresponding to the service type is obtained. Specifically, the server can obtain the target sending content (extraInfo) corresponding to the service type for the caller account according to the live broadcast room ID, the user ID, and the user role type. The server performs the splicing processing on the content to be sent and the target sending content and also decorates thereon according to the message configuration parameter to obtain the target message.

Figure 6:
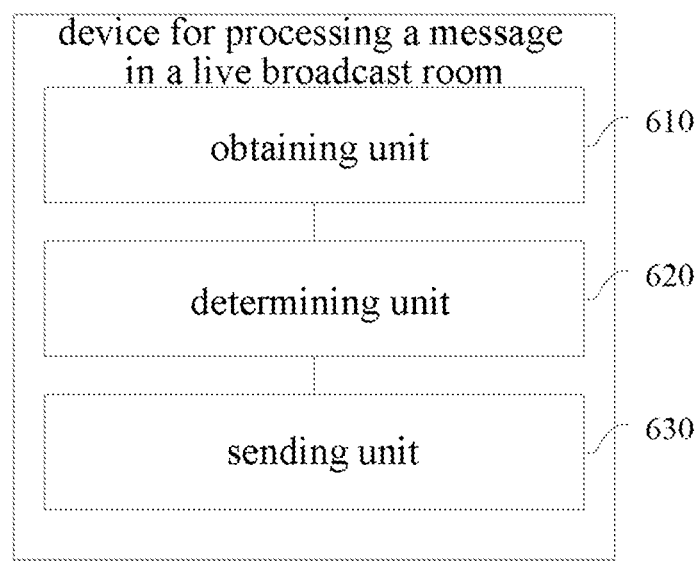
FIG. 6 is a block diagram showing a device for processing a message in a live broadcast room according to some arrangements.

FIG. 6 is a block diagram showing a device for processing a message in a live broadcast room according to some arrangements. Referring to FIG. 6, the device includes an obtaining unit 610, a determining unit 620, and a sending unit 630.

The obtaining unit 610 is configured to detect that a target message interaction interface among pre-configured message interaction interfaces has been called, obtain a message configuration parameter corresponding to the target message interaction interface, and obtain a service type and a caller account incoming with the target message interaction interface. The message interaction interface is used for respective accounts in the live broadcast room for message interaction.

The determining unit 620 is configured to determine a respective content to be sent according to the service type and the caller account, and determine a respective target client according to an account type of the caller account.

The sending unit 630 is configured to perform splicing processing on the content to be sent according to the message configuration parameter to obtain a target message, and send the target message to the target client.

In some arrangements, the determining unit 620 is configured to use a client corresponding to a user account in the live broadcast room as the target client in response to determining that the caller account is the user account. The user account in the live broadcast room is an anchor account or a viewer account, and the target client is a client corresponding to the anchor account or a client corresponding to the viewer account.

In some arrangements, the determining unit 620 is configured to: obtain a message sending mode corresponding to the target message interaction interface in response to determining that the caller account is a service party account in the live broadcast room; and determine the respective target client according to the message sending mode. The target client includes a client corresponding to an anchor account and/or a client corresponding to a viewer account in the live broadcast room.

In some arrangements, the message interaction interface includes an interaction interface oriented to a service party account in the live broadcast room, and the interaction interface oriented to the service party account in the live broadcast room includes at least one of a broadcast interface and a unicast interface. The determining unit 620 is configured to: determine that the message sending mode is a broadcast mode in response to determining that the target message interaction interface is the broadcast interface; and determine that the message sending mode is a unicast mode in response to determining that the target message interaction interface is the unicast interface.

In some arrangements, the determining unit 620 is configured to: use the client corresponding to the anchor account and the client corresponding to the viewer account as the target client in response to determining that the message sending mode is the broadcast mode; obtain a receiver account incoming with the target message interaction interface in response to determining that the message sending mode is the unicast mode, the receiver account being at least one of the anchor account or the viewer account; and use a client corresponding to the receiver account as the target client.

In some arrangements, the message interaction interface further includes an interaction interface oriented to a user account in the live broadcast room, and the interaction interface oriented to the user account in the live broadcast room includes an account status interface and a delay request interface. The determining unit 620 is configured to: query account status information according to the service type and the caller account in response to determining that the target message interaction interface is the account status interface, the account status information being relevant status information of the caller account corresponding to the service type in the live broadcast room; use the account status information as the content to be sent; and use a delay display message of the caller account corresponding to the service type in the live broadcast room as the content to be sent in response to determining that the target message interaction interface is the delay request interface.

In some arrangements, the device further includes: a transmitting unit, configured to transmit a message delay display instruction to a client of the caller account, the message delay display instruction carries a message delay display time. After the message delay display instruction is received by the client of the caller account, the delay request interface is called in response to determining that the caller account has been detected to enter and stay in the live broadcast room for the message delay display time.

In some arrangements, the sending unit 630 is configured to: determine whether the caller account under the service type has the permission for sending message; obtain target sending content corresponding to the service type in response to determining that the caller account under the service type has the permission for sending message, the target sending content including service information corresponding to the service type; and perform the splicing processing on the content to be sent and the target sending content according to the message configuration parameter to obtain the target message.

In some arrangements, the determining unit 620 is configured to: query message view content corresponding to the service type and used to replace the content to be sent; and perform the splicing processing on the message view content and the target sending content according to the message configuration parameter to obtain a target message view as the target message.

Regarding the device in the foregoing arrangements, a specific manner in which each module performs operations has been described in detail in the arrangements of the method, and detailed description will not be given here.

Figure 7:
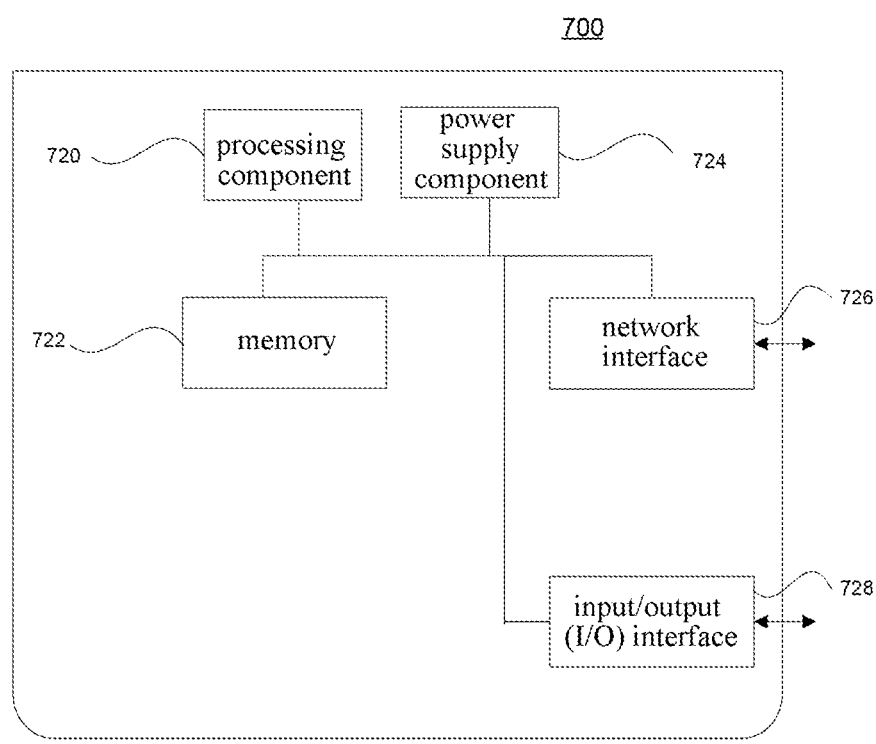
FIG. 7 is a diagram showing an internal structure of a server according to some arrangements.

FIG. 7 is a block diagram showing a device 700 for executing a method for processing a message in a live broadcast room according to some arrangements. For example, the device 700 may be a server. Referring to FIG. 7, the device 700 includes a processing component 720, which further includes one or more processors, and a memory resource represented by a memory 722 for storing instructions (such as an application program) executable by the processing component 720. The application program stored in the memory 722 may include one or more modules, each corresponding to a set of instructions. In addition, the processing component 720 is configured to execute instructions to perform the above-mentioned method for processing a message in a live broadcast room.

The device 700 may also include a power supply component 724 configured to perform power management of the device 700, a wired or wireless network interface 726 configured to connect the device 900 to a network, and an input/output (I/O) interface 728. The device 700 can operate based on an operating system stored in the memory 722, such as Windows Server™, Mac OS X™, Unix™, Linux™, FreeBSD™ or the like.

In some arrangements, there is also provided a non-transitory computer readable storage medium including instructions, such as a memory 722 including instructions executable by the processor of the device 700 to perform the above described method. For example, the non-transitory computer-readable storage medium may be a ROM, a random access memory (RAM), a CD-ROM, a magnetic tape, a floppy disc, and an optical data storage device Other arrangements of the present disclosure will be apparent to those skilled in the art from consideration of the present specification and practice of the present disclosure disclosed herein. The present application is intended to cover any variations, uses, or adaptations of the present disclosure, which are in accordance with the general principle of the present disclosure and include common general knowledge or conventional technical means in the art that are not disclosed in the present disclosure. The specification and arrangements are illustrative, and the real scope and spirit of the present disclosure is defined by the appended claims.

It should be understood that the present disclosure is not limited to the precise structures that have been described above and shown in the drawings, and various modifications and changes can be made without departing from the scope thereof. The scope of the present disclosure is limited only by the appended claims.

What is claimed is:

1. A method for processing a message in a live broadcast room, comprising:
    in response to detecting that a target message interaction interface among pre-configured message interaction interfaces is called, obtaining a message configuration parameter corresponding to the target message interaction interface;
    obtaining a service type and a caller account incoming with the target message interaction interface, wherein the message interaction interfaces are used for respective accounts in the live broadcast room for message interaction;
    determining a respective content to be sent according to the service type and the caller account;
    determining a respective target client according to an account type of the caller account;
    performing splicing processing on the content to be sent according to the message configuration parameter to obtain a target message; and
    sending the target message to the target client.

2. The method for processing a message in a live broadcast room according to claim 1, wherein
    the target client is a client corresponding to the caller account in response to determining that the caller account is a user account in the live broadcast room; and
    the user account in the live broadcast room is an anchor account or a viewer account, and the target client is a client corresponding to the anchor account or a client corresponding to the viewer account.

3. The method for processing a message in a live broadcast room according to claim 1, wherein said determining the respective target client according to the account type of the caller account, comprises:
    obtaining a message sending mode corresponding to the target message interaction interface in response to determining that the caller account is a service party account in the live broadcast room; and
    determining the respective target client according to the message sending mode, wherein the target client comprises a client corresponding to an anchor account and/or a client corresponding to a viewer account in the live broadcast room.

4. The method for processing a message in a live broadcast room according to claim 3, wherein each of the message interaction interfaces comprises an interaction interface oriented to the service party account in the live broadcast room, the interaction interface oriented to the service party account in the live broadcast room comprises at least one of a broadcast interface and a unicast interface,
    said determining the message sending mode corresponding to the target message interaction interface, comprises:
        determining that the message sending mode is a broadcast mode in response to determining that the target message interaction interface is the broadcast interface; and
        determining that the message sending mode is a unicast mode in response to determining that the target message interaction interface is the unicast interface.

5. The method for processing a message in a live broadcast room according to claim 4, wherein
    the target client is the client corresponding to the anchor account and the client corresponding to the viewer account and the message sending mode is the broadcast mode;
    the method further comprises obtaining a receiver account incoming with the target message interaction interface in response to determining that the message sending mode is the unicast mode, wherein the receiver account is at least one of the anchor account or the viewer account, and the target client is a client corresponding to the receiver account.

6. The method for processing a message in a live broadcast room according to claim 1, wherein
    each of the message interaction interfaces further comprises an interaction interface oriented to a user account in the live broadcast room, the interaction interface oriented to the user account in the live broadcast room comprises an account status interface and a delay request interface,
    said determining the respective content to be sent according to the service type and the caller account comprises:
    querying account status information according to the service type and the caller account in response to determining that the target message interaction interface is the account status interface, wherein the account status information is relevant status information of the caller account corresponding to the service type in the live broadcast room, and the content to be sent is the account status information; and wherein the content to be sent is a delay display message of the caller account corresponding to the service type in the live broadcast room and the target message interaction interface is the delay request interface.

7. The method for processing a message in a live broadcast room according to claim 6, wherein the method further comprises:
    sending a message delay display instruction to a client of the caller account, wherein
    the message delay display instruction carries a message delay display time;
    the message delay display time indicates a time duration, for which the caller account has been detected to enter and stay in the live broadcast room after the message delay display instruction is received by the client of the caller account, thus calling the delay request interface.

8. The method for processing a message in a live broadcast room according to claim 1, wherein said performing the splicing processing on the content to be sent according to the message configuration parameter to obtain the target message, comprises:

determining whether the caller account under the service type has a permission for sending messages;

obtaining target sending content corresponding to the service type in response to determining that the caller account under the service type has the permission for sending messages, wherein the target sending content comprises service information corresponding to the service type; and performing the splicing processing on the content to be sent and the target sending content according to the message configuration parameter to obtain the target message.

9. The method for processing a message in a live broadcast room according to claim 8, wherein said performing the splicing processing on the content to be sent and the target sending content according to the message configuration parameter to obtain the target message, comprises:

querying message view content corresponding to the service type and used to replace the content to be sent; and performing the splicing processing on the message view content and the target sending content according to the message configuration parameter to obtain a target message view as the target message.

10. A device for processing a message in a live broadcast room, comprising:

an obtaining unit, configured to:

in response to detecting that a target message interaction interface among pre-configured message interaction interfaces is called, obtain a message configuration parameter corresponding to the target message interaction interface;

obtain a service type and a caller account incoming with the target message interaction interface, wherein the message interaction interfaces are used for respective accounts in the live broadcast room for message interaction;

a determining unit, configured to determine a respective content to be sent according to the service type and the caller account, and determine a respective target client according to an account type of the caller account; and a sending unit, configured to perform splicing processing on the content to be sent according to the message configuration parameter to obtain a target message, and send the target message to the target client.

11. The device for processing a message in a live broadcast room according to claim 10, wherein the target client is a client corresponding to the caller account in response to determining that the caller account is a user account in the live broadcast room, and the user account in the live broadcast room is an anchor account or a viewer account, and the target client is a client corresponding to the anchor account or a client corresponding to the viewer account.

12. The device for processing a message in a live broadcast room according to claim 10, wherein the determining unit is configured to:

obtain a message sending mode corresponding to the target message interaction interface in response to determining that the caller account is a service party account in the live broadcast room; and determine the respective target client according to the message sending mode, wherein the target client comprises a client corresponding to an anchor account and/or a client corresponding to a viewer account in the live broadcast room.

13. The device for processing a message in a live broadcast room according to claim 12, wherein each of the message interaction interfaces comprises an interaction interface oriented to the service party account in the live broadcast room, the interaction interface oriented to the service party account in the live broadcast room comprises at least one of a broadcast interface and a unicast interface, said determining unit is configured to determine that the message sending mode is a broadcast mode in response to determining that the target message interaction interface is the broadcast interface; and determine that the message sending mode is a unicast mode in response to determining that the target message interaction interface is the unicast interface.

14. The device for processing a message in a live broadcast room according to claim 13, wherein the target client is the client corresponding to the anchor account and the client corresponding to the viewer account and the message sending mode is the broadcast mode;

the determining unit is configured to obtain a receiver account incoming with the target message interaction interface in response to determining that the message sending mode is the unicast mode, wherein the receiver account is at least one of the anchor account or the viewer account, and the target client is a client corresponding to the receiver account.

15. The device for processing a message in a live broadcast room according to claim 10, wherein each of the message interaction interfaces further comprises an interaction interface oriented to a user account in the live broadcast room, the interaction interface oriented to the user account in the live broadcast room comprises an account status interface and a delay request interface, the determining nit is configured to:

querying account status information according to the service type and the caller account in response to determining that the target message interaction interface is the account status interface, wherein the account status information is relevant status information of the caller account corresponding to the service type in the live broadcast room, and the content to be sent is the account status information; and the content to be sent is a delay display message of the caller account corresponding to the service type in the live broadcast room and the target message interaction interface is the delay request interface.

16. The device for processing a message in a live broadcast room according to claim 15, wherein the device further comprises a transmitting unit configured to transmit a message delay display instruction to a client of the caller account, wherein the message delay display instruction carries a message delay display time, and the message delay display time indicates a time duration, for which the caller account has been detected to enter and stay in the live broadcast room after the message delay display instruction is received by the client of the caller account, calling the delay request interface.

17. The device for processing a message in a live broadcast room according to claim 10, the sending unit is configured to:
   determine whether the caller account under the service type has a permission for sending messages;
   obtain target sending content corresponding to the service type in response to determining that the caller account under the service type has the permission for sending messages, wherein the target sending content comprises service information corresponding to the service type; and
   perform the splicing processing on the content to be sent and the target sending content according to the message configuration parameter to obtain the target message.

18. The device for processing a message in a live broadcast room according to claim 17, wherein the determining unit is configured to:
   query message view content corresponding to the service type and used to replace the content to be sent; and
   perform the splicing processing on the message view content and the target sending content according to the message configuration parameter to obtain a target message view as the target message.

19. A non-transitory storage medium, wherein instructions in the storage medium, when executed by a processor of a server, cause the server to perform operations of:
   in response to detecting that a target message interaction interface among pre-configured message interaction interfaces is called, obtaining a message configuration parameter corresponding to the target message interaction interface;
   obtaining a service type and a caller account incoming with the target message interaction interface is called, wherein the message interaction interfaces are used for respective accounts in the live broadcast room for message interaction;
   determining a respective content to be sent according to the service type and the caller account;
   determining a respective target client according to an account type of the caller account;
   performing splicing processing on the content to be sent according to the message configuration parameter to obtain a target message; and
   sending the target message to the target client.

* * * * *